(12) United States Patent
Imperiali

(10) Patent No.: US 6,526,528 B1
(45) Date of Patent: Feb. 25, 2003

(54) TICKET PUNCH WATCHDOG MONITOR

(75) Inventor: Steven Robert Imperiali, Endwell, NY (US)

(73) Assignee: BAE Systems Controls, Inc., Johnson City, NY (US)

( * ) Notice: Subject to any disclaimer, the term of this patent is extended or adjusted under 35 U.S.C. 154(b) by 0 days.

(21) Appl. No.: 09/487,847

(22) Filed: Jan. 19, 2000

(51) Int. Cl.[7] .............................................. G06F 11/00
(52) U.S. Cl. ............................ 714/56; 714/55; 714/51
(58) Field of Search ............................. 714/56, 55, 51, 714/50, 43, 39, 37, 9

(56) References Cited

U.S. PATENT DOCUMENTS

| | | | | |
|---|---|---|---|---|
| 5,515,507 A | * | 5/1996 | Byers et al. | 714/56 |
| 5,815,647 A | * | 9/1998 | Buckland et al. | 710/104 |
| 6,253,250 B1 | * | 6/2001 | Evans et al. | 709/216 |
| 6,272,651 B1 | * | 8/2001 | Chin et al. | 714/43 |
| 6,339,833 B1 | * | 1/2002 | Guo | 327/20 |
| 6,412,089 B1 | * | 6/2002 | Lenny et al. | 714/718 |

* cited by examiner

*Primary Examiner*—Robert Beausoleil
*Assistant Examiner*—Yolanda Wilson
(74) *Attorney, Agent, or Firm*—Geoffrey H. Krauss; William H. Meise

(57) ABSTRACT

A watchdog monitor coupled to a device bus includes in at least one executable software the ability to produce, during each frame interval, a strobe addressing a predetermined number to the monitor. The monitor responds to the interrupt and to lack of arrival of the correct predetermined number by generating a fault flag. The monitor also runs an internal counter which is reset at each interrupt signal; the count of the internal counter exceeds a threshold count if an interrupt fails to arrive. Such a timed failure results in setting of a frame fault flag. The monitor further runs an internal clock independent of the system clock. A further missing pulse detector initiates a counter at each monitor clock pulse, and raises a flag if the monitor clock counter counts a duration exceeding the monitor inter-clock-pulse interval.

1 Claim, 5 Drawing Sheets

TICKET PUNCH WATCHDOG MONITOR

FIELD OF THE INVENTION

This invention relates to watchdog monitors, and more particularly to such monitors which independently test the microprocessor operation.

BACKGROUND OF THE INVENTION

In FIG. 1, a computing or processing system 10 includes a microprocessor (μP) 12 connected to a memory 14 by way of a local bus 16. The local bus is designed for very high operating speed in order to maximize the throughput of the computer. A north bridge 18 connects to local bus 16, and interfaces the local bus with a standard bus, such as a PCI bus 20. PCI bus 20 is coupled to a plurality of card sockets, designated 22a, 22b, . . . , 22N, which are adapted to accept industry-standard cards for interconnecting functions such as video and audio interfaces, printers, scanners, and the like. As mentioned, the computer system may also include nonstandard devices such as programmable timers, additional memory, interrupt controllers, and the like, which are typically mounted on the motherboard. These nonstandard devices are illustrated as blocks 28a, . . . , 28M, and are illustrated as being connected by way of a device bus 26 and a south bridge 24 to the PCI bus 20.

The system 10 of FIG. 1 also includes a frame timing source 30 which produces frame interrupt signals defining a frame interval on a frame interrupt bus 32 for application to microprocessor 12 and to a watchdog monitor (WDM) 34. Watchdog monitor 34 receives data, addresses, and device commands from device bus 26, frame interrupt signals by way of bus 32, and power turn-on reset (PTOR) signals from a source 36. The PTOR signals are also applied to microprocessor 12. The watchdog monitor 34 monitors the state of the system 10 and produces a watchdog monitor failure (WDMF) signal on an output bus 38 for further use.

FIG. 2 illustrates details of a prior-art watchdog monitor the computing or processing system of FIG. 1. The arrangement of FIG. 2 includes a retriggerable astable multivibrator 210 with a triggered duration which exceeds the time between interrupt pulses, and which generates an interrupt or frame failure fault flag on a bus 211 if the multivibrator ever resets to its stable state. This prior-art system also includes a further astable multivibrator 212 triggered by the interrupt pulses, which generates a signal on a line 213 which defines a time window. During this time window, a window detector 214 seeks a particular strobe at a particular watchdog monitor address. The microprocessor, in this prior-art system, is associated with interrupt-handling software which directs the generation of the particular strobe within the time window. Failure of the strobe to appear during the window is deemed to be a microprocessor failure. Thus, this prior art watchdog monitor monitors for both frame and microprocessor failure. Appearance of the strobe signal outside of the defined time window is deemed to be a fault.

The abovedescribed watchdog monitor simply determines if the microprocessor can service the monitor. However, the microprocessor may be able to service the monitor even if it is incapable of running the application software. For example, if the application software is caught in an infinite loop, the occurrence of the interrupt releases the microprocessor from the loop, and makes it available to service the monitor. However, when the microprocessor is returned from the interrupt handler to the application software, it is returned to the infinite loop, and performs no useful function. The prior-art monitor does not verify that the application software is exercising all of the tasks assigned during a frame. Systems using the prior-art watchdog monitor scheme use other tests to address the limitations of the watchdog monitor; these additional tests, however, involve software, so that the microprocessor is undesirable checking itself.

Improved watchdog monitors are desired.

SUMMARY OF THE INVENTION

A computing or processing system according to the invention comprises a microprocessor including a local bus port and at least one interrupt port. A local memory is coupled by way of a local bus to the local bus port of the microprocessor. A north bridge is coupled to the local bus port, for translating signals on the local bus to an industry-standard bus form. A south bridge is coupled to the industry-standard bus, for translating signals on the industry-standard bus to a device bus. A monitor arrangement is coupled to the device bus. The monitor arrangement includes (a) a clock independent of the system clock, for generating monitor clock signals, (b) a first missing-pulse detector coupled to the clock, for initiating counting at each monitor clock pulse, and for setting a clock failure flag if the count exceeds a threshold. The monitor arrangement further includes an ID validation machine adapted for receiving the monitor clock signals, device-level reset signals representative of initial turn-on of the monitor arrangement, data signals, device control signals, and microprocessor frame interrupt signals, for comparing at least one received microprocessor-generated predetermined word with a stored version of the word. This verifies that the microprocessor produces the correct word, and the north and south bridges properly translate the word. The ID validation machine sets an ID flag if the received and stored words differ, to thereby indicate a fault. The monitor arrangement further includes a second missing-pulse detector coupled to receive frame interrupt signals from the device bus, for initiating counting upon occurrence of each successive frame interrupt signal, and for setting a frame fault flag if the count exceeds a threshold. A gate is coupled to the first and second missing-pulse detectors, and to the ID validation machine, for generating a watchdog monitor fail signal if any one of the clock failure, ID, or frame fault flags is set. The computing or processing system according to the invention further includes means for causing the microprocessor to produce, during a frame following receipt of an interrupt signal at the interrupt port, at least the one predetermined word addressed to the monitor arrangement.

DESCRIPTION OF THE INVENTION

Figure 1:
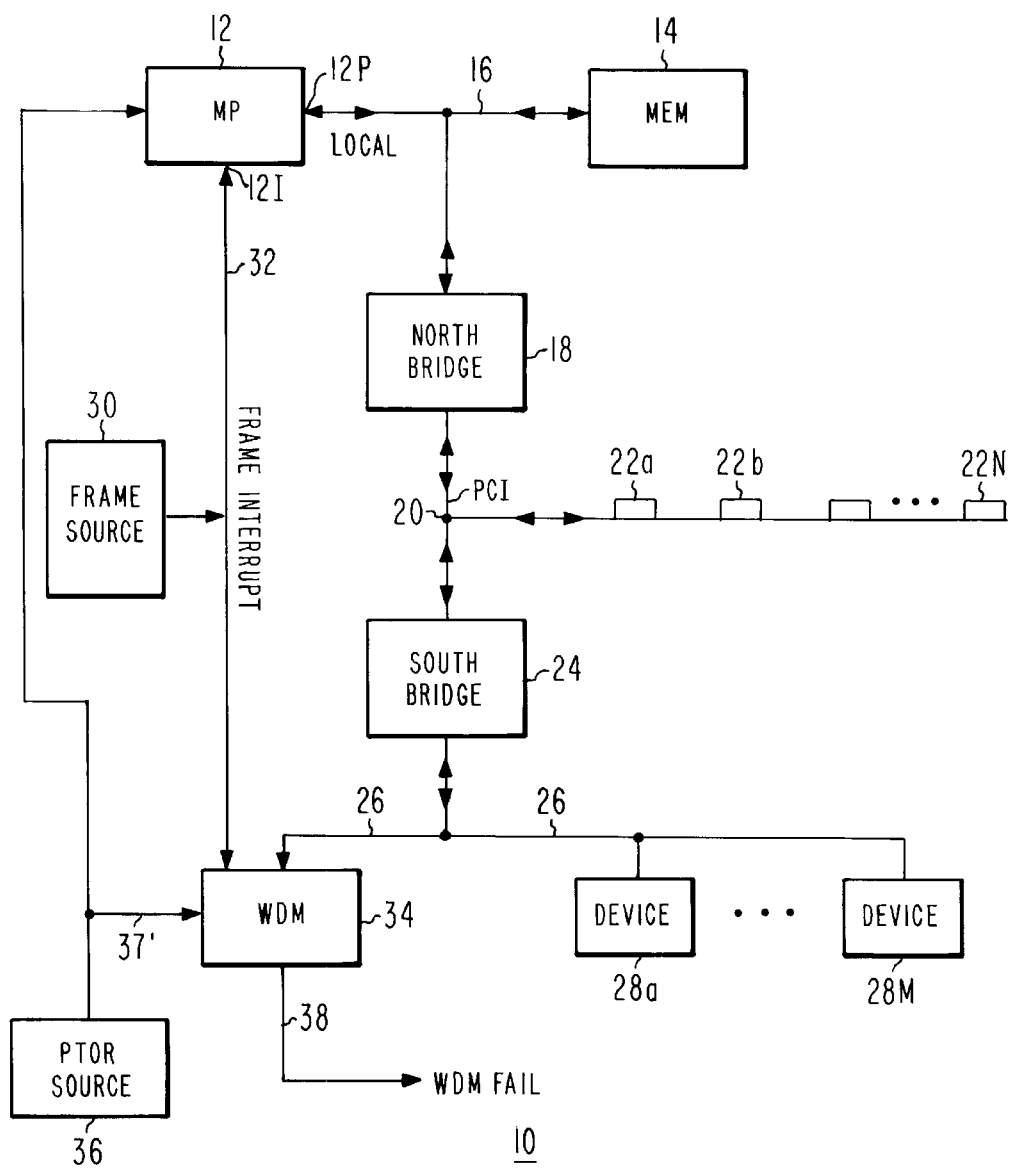
FIG. 1 is a simplified block diagram of a computer or processing system using a microprocessor and a watchdog monitor.
Figure 2:
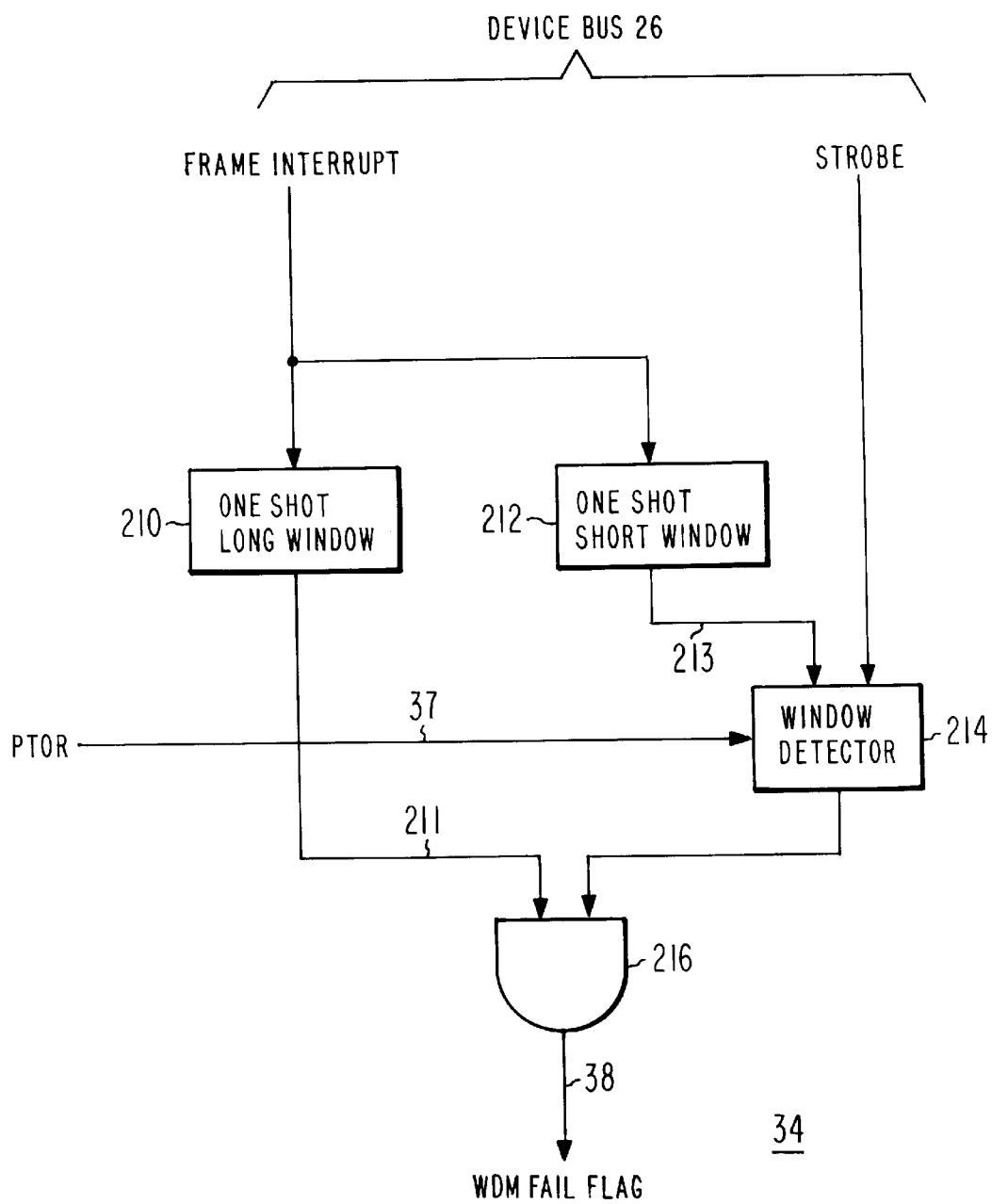
FIG. 2 is a simplified block diagram of a prior art watchdog monitor arrangement which may be used in the arrangement of FIG. 1.

The block diagram of FIG. 1 is sufficiently general so that it applies to the prior art, but is also the context for the improved monitoring system according to the invention.

Figure 3:
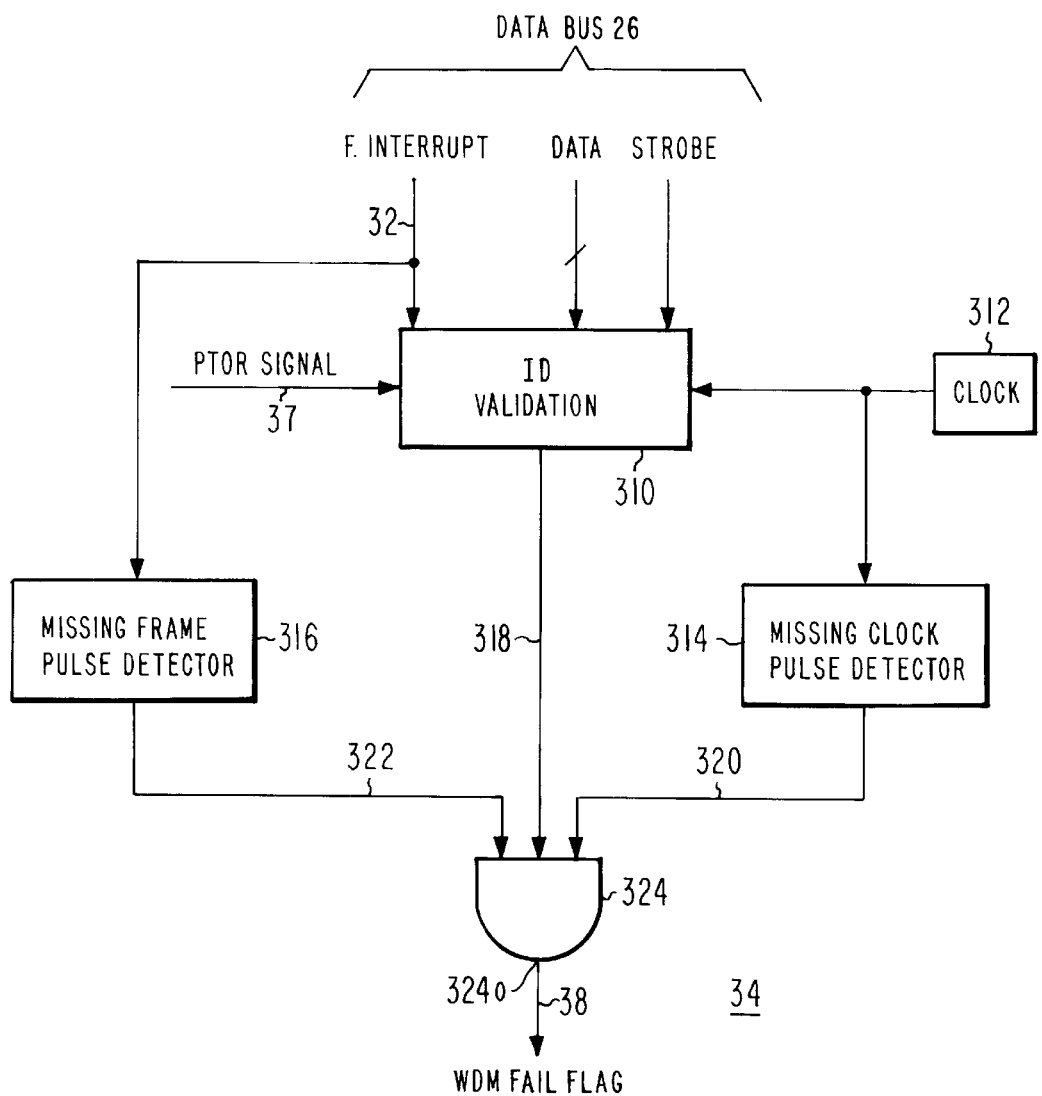
FIG. 3 is a simplified block diagram of a watchdog monitor according to an aspect of the invention.

FIG. 3 is a simplified block diagram of a watchdog monitor which may be used in block 34 of FIG. 1 in accordance with an aspect of the invention. In FIG. 3, data and strobe inputs, and frame interrupt (F Interrupt) signals are applied from the device bus 26 to an identification (ID) validation block 310. Block 310 also receives clock signals from a clock (CLK) block 312. Clock 312 operates autonomously, and is not dependent on any other clock in the computing system 10. The clock signals are also applied to a missing clock pulse detector block 314.

The arrangement of FIG. 3 also includes a missing frame pulse detector 316, which receives F Interrupt signals from device bus 26. Failure flags which may be generated by ID validation block 310, missing clock pulse detector 314, andor missing frame detector block 316, are generated on buses 318, 320, andor 322, respectively, for application to the input ports of a gate. As illustrated, the gate is an AND gate, as used in an actual embodiment of the invention, in which negative logic is used. Functionally, the gate is an OR gate, in that it responds to a set flag at any of its input ports by setting its output port 324o. The watchdog monitor flag is coupled by a bus 38 to a user device or apparatus as in the prior art.

Figure 4:
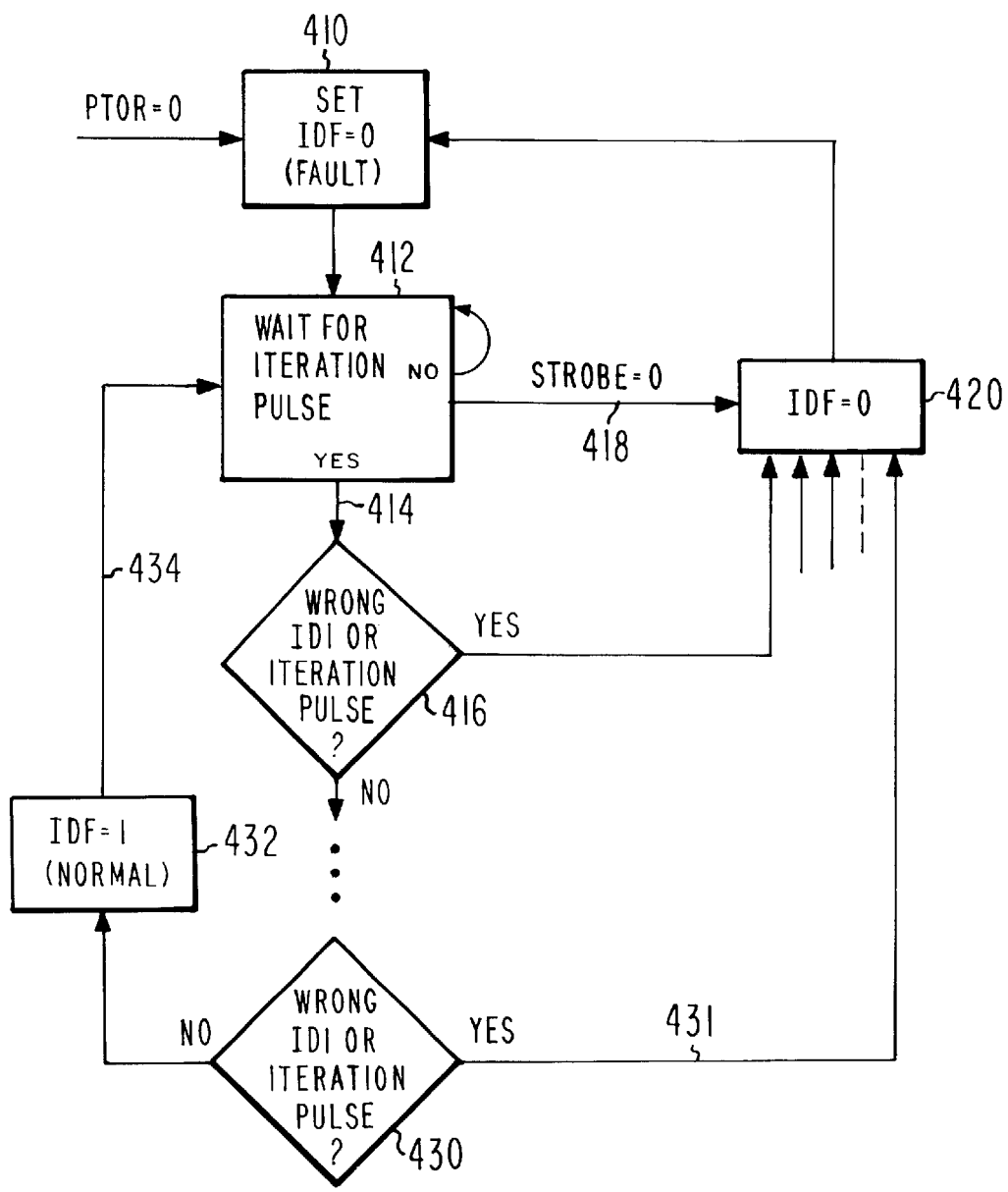
FIG. 4 is a block diagram illustrating the operation of a portion of the arrangement of FIG. 3.

FIG. 4 is a simplified flow chart which describes a portion of the operation of ID validation block 310 of FIG. 3. In FIG. 4, the logic begins at a block 410, which represents the setting to a value of zero of the IDF flag on bus 318 in response to the initial start-up signal PTOR=0. The zero value represents a failed state of the microprocessor system. From block 410, the logic flows to a block 412, which represents a delay, awaiting the frame interrupt signal or the strobe signal. If neither is applied to the ID validation block 310 of FIG. 3, the logic remains quiescent in the failed state. If a frame interrupt signal arrives, the logic leaves block 412 by the YES output, and proceeds by way of logic path 414 to a decision block 416. If a frame interrupt signal fails to arrive, but a strobe signal having zero value arrives, the logic leaves block 412 by a logic path 418, and proceeds to a block 420. Block 420 represents failure of the validation, and a delay until the occurrence of another PTOR=0 signal (another turn-on).

Figures 5A, 5B, 5C:
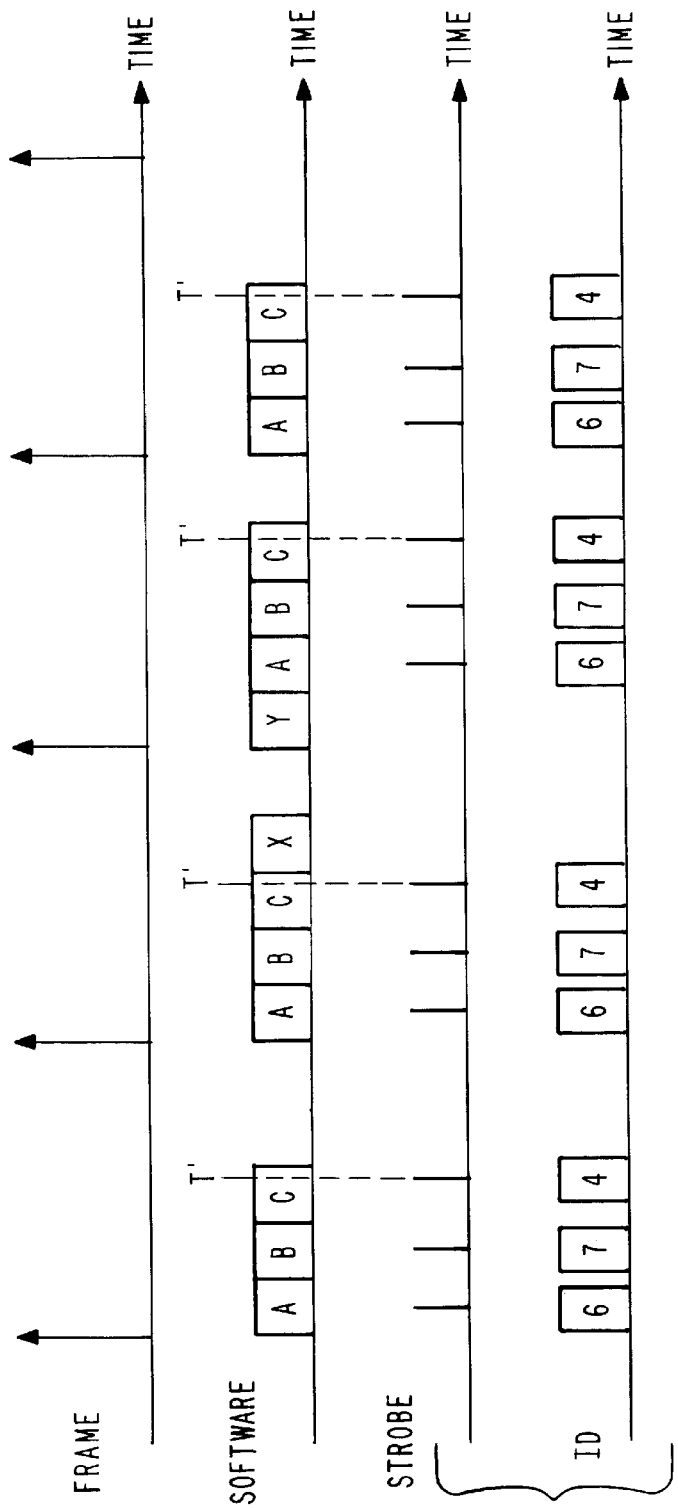
FIG. 5a is a time plot illustrating sequential frame pulses, FIG. 5b illustrate times during which various different programs are processed during each frame interval.
FIG. 5c illustrates strobe and ID times.

In FIG. 4, the logic arrives at decision block 416 if an interrupt signal has been received. The sequential frame interrupt pulses are represented as time plot 510 in FIG. 5a. Decision block 416 waits to receive identification word(s) following the interrupt pulse. The identification words are embedded in software being run by the processor. Blocks A, B, and C of FIG. 5b illustrate times during which three different programs which are always processed by the microprocessor 12 during each frame interval, and additional blocks X and Y of FIG. 5b represent other programs which may also occasionally be processed. Each of the programs A, B, and C includes provision for generation by the microprocessor of an identification word. In the example, the identification words are "6" for program A, "7" for program B, and "4" for program C, with each having the same address space, which specifies the watchdog monitor 34. Thus, each time the microprocessor 12 runs the A program during one frame interval, it generates the "6" identification to the monitor, together with a strobe addressing the watchdog monitor. Similarly, running of the B program during a given frame interval produces the "7" word with the same strobe, and running of the C program during the frame interval strobes the "4" word to the watchdog monitor 34. In FIG. 4, block 412 routes the logic by way of a logic path 418 to the IDF=0 (failure) block 420 if a strobe arrives in the absence of a preceding frame pulse, because this would indicate that the program is attempting to run without proper control. As will be shown, this also tests for the occurrence of program loop.

In FIG. 4, the logic leaves delay or waiting block 412 by way of logic path 414, and arrives at a decision block 416. Decision block 416 responds to the arrival of the correct first word strobed in following the frame pulse, corresponding to the "6" word contained in program A of FIG. 5b. If the word or its address is wrong, the proper word will not arrive, and the next following strobe will not be the desired "6", but will instead be the incorrect value "7". At this time, decision block 416 will route the logic by way of its YES output and logic path 422 to the IDF=0 block 420. If the word which is strobed in is the correct word "6", the logic leaves decision block 416 by the NO output, and proceeds to additional decision blocks (not illustrated), arranged in the same manner to look for the other identification words in the sequence (the words "7" and "4" in the example). At each step, arrival of the incorrect word, which is equivalent to the failure of a given word to arrive, routes the logic to block 420, to indicate a failure. In FIG. 4, the last decision block in the sequence is illustrated as 430. Decision block 430 looks for strobing in of the last identification word. If it arrives, the logic is routed by way of the NO output of decision block 430 to a block 432, which represents a complete valid service sequence of identification words. Block 432 sets the value of the IDF signal on bus 318 to a logic high or "1," representing normal operation. The logic then returns to block 412 by way of a logic path 434.

A complete service as defined in conjunction with FIG. 4 ends at some time within each of the C application programs illustrated in FIG. 5b. Consequently, at times such as times T' in FIG. 5b, block 412 is set to awaiting the next following frame strobe pulse of the sequence of FIG. 5a. If a strobe of any sort arrives at the watchdog monitor before the next frame strobe, this is a clear indication of a fault, suggesting that the program is looping back on itself. In this event, block 412 of FIG. 4 immediately routes the logic by way of path 418 to the fault-indicating block 420.

Thus, a computing or processing system according to the invention comprises a microprocessor (12) including a local bus port (12P) and at least one interrupt port (12I). A local memory (14) is coupled by way of a local bus (16) to the local bus port (12P) of the microprocessor (12). A north bridge (18) is coupled to the local bus port (12P), for translating signals on the local bus (16) to an industry-standard (PCI) bus (20) form. A south bridge (24) is coupled to the industry-standard bus (20), for translating signals on the industry-standard bus (20) to a device bus (26). A monitor arrangement (34) is coupled to the device bus (16). The monitor arrangement (34) includes (a) a clock (312) independent of the system (10) clock, for generating monitor clock signals, (b) a first missing-pulse detector (314) coupled to the clock (312), for initiating counting at each monitor clock pulse, and for setting a clock failure flag if the count exceeds a threshold. The monitor arrangement further includes an ID validation machine (310) adapted for receiving the monitor clock signals, device-level reset signals representative of initial turn-on of the monitor arrangement, data signals, device control signals, and microprocessor (12) frame interrupt signals, for comparing at least one received microprocessor-generated predetermined word with a stored version of the word. This verifies that the microprocessor (12) produces the correct word, and the north (18) and south (24) bridges properly translate the word. The ID validation machine (310) sets an ID flag if the received and stored words differ, to thereby indicate a fault. The monitor arrangement (34) further includes a second missing-pulse detector (316) coupled to receive frame interrupt signals from the device bus (26), for initiating counting upon occurrence of each successive frame interrupt signal, and for setting a frame fault flag if the count exceeds a threshold. A gate (324) is coupled to the first (314) and second (316) missing-pulse detectors, and to the ID validation machine (310), for generating a watchdog monitor fail signal if any one of the clock failure, ID, or frame fault flags is set. The computing or processing system according to the invention further includes means for causing the microprocessor (12) to produce, during a frame following receipt of an interrupt signal at the interrupt port, at least the one predetermined word addressed to the monitor arrangement (34).

What is claimed is:

1. A computing or processing system comprising:

a microprocessor including a local bus port and at least one interrupt port;

a local memory coupled to said local bus port of said microprocessor;

a north bridge coupled to said local bus port, for translating signals on said local bus to a standardized format on an industry-standard bus;

a south bridge coupled to said industry-standard bus, translates signals on said industry-standard bus to a device bus;

a monitor arrangement coupled to said device bus, said monitor arrangement further comprising:

a clock independent of the system clock, for generating monitor clock signals;

a first missing-pulse detector coupled to said clock, for initiating counting at each monitor clock pulse, and for setting a clock failure flag if the count exceeds a threshold;

an ID validation machine adapted for receiving said monitor clock signals, device-level reset signals representative of initial turn-on of said monitor arrangement, data signals, device control signals, and microprocessor frame interrupt signals, for comparing at least one received microprocessor-generated predetermined word with a stored version of said word, for verifying that the microprocessor produces, and the north and south bridges properly translate, said ID validation machine setting an ID flag if said received and stored words differ;

a second missing-pulse detector coupled to receive frame interrupt signals from said device bus, for initiating counting upon occurrence of each successive frame interrupt signal, and for setting a frame fault flag if the count exceeds a threshold; and a gate coupled to said first and second missing-pulse detectors, and to said ID validation machine, for generating a watchdog monitor fail signal if any one of said clock failure, ID, or frame fault flags is set; and means for causing said microprocessor to produce, during a frame following receipt of an interrupt signal at said interrupt port, at least said one predetermined word addressed to said monitor arrangement.

\* \* \* \* \*